No. 619,094. Patented Feb. 7, 1899.
J. J. SHEDLOCK.
EXTRACTING METALS FROM THEIR ORES AND APPARATUS THEREFOR.
(Application filed June 21, 1897.)
(No Model.) 6 Sheets—Sheet 1.

Witnesses: Inventor:
J. J. Shedlock
by Wilkinson & Fisher
Attorneys.

No. 619,094. Patented Feb. 7, 1899.
J. J. SHEDLOCK.
EXTRACTING METALS FROM THEIR ORES AND APPARATUS THEREFOR.
(Application filed June 21, 1897.)
(No Model.) 6 Sheets—Sheet 2.
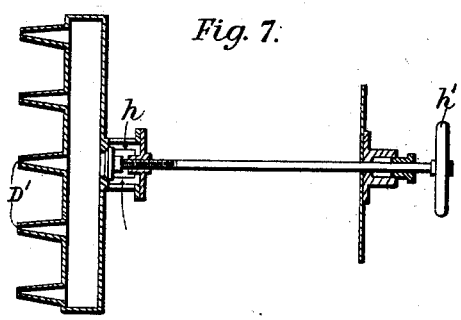
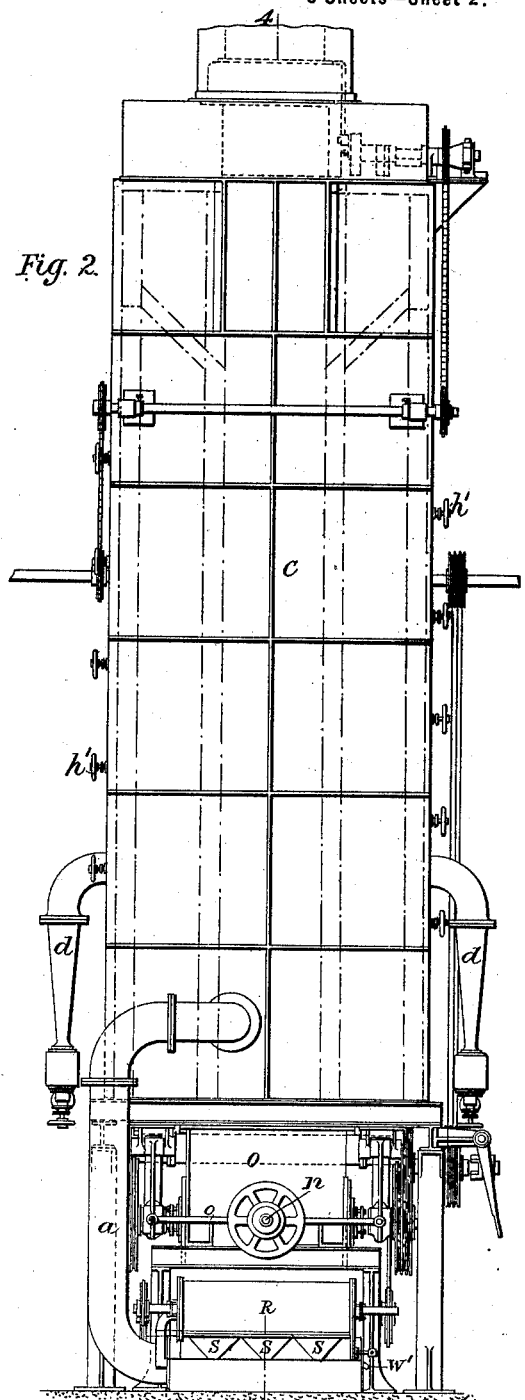
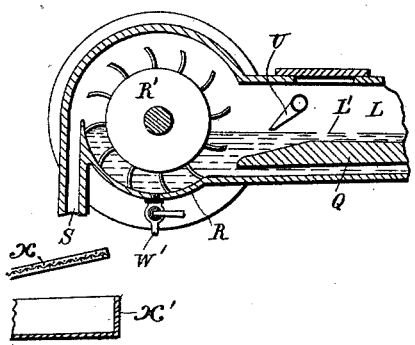
Witnesses: Inventor:
J. J. Shedlock,
by Wilkinson & Fisher
Attorneys.

No. 619,094. Patented Feb. 7, 1899.
J. J. SHEDLOCK.
EXTRACTING METALS FROM THEIR ORES AND APPARATUS THEREFOR.
(Application filed June 21, 1897.)
(No Model.) 6 Sheets—Sheet 3.

No. 619,094. Patented Feb. 7, 1899.
J. J. SHEDLOCK.
EXTRACTING METALS FROM THEIR ORES AND APPARATUS THEREFOR.
(Application filed June 21, 1897.)
(No Model.) 6 Sheets—Sheet 4.

Witnesses:
F. C. Yeates.
Percy C. Bowen.

Inventor.
J. J. Shedlock
by Wilkinson & Fisher,
Attorneys.

No. 619,094. Patented Feb. 7, 1899.
J. J. SHEDLOCK.
EXTRACTING METALS FROM THEIR ORES AND APPARATUS THEREFOR.
(Application filed June 21, 1897.)
(No Model.) 6 Sheets—Sheet 5.

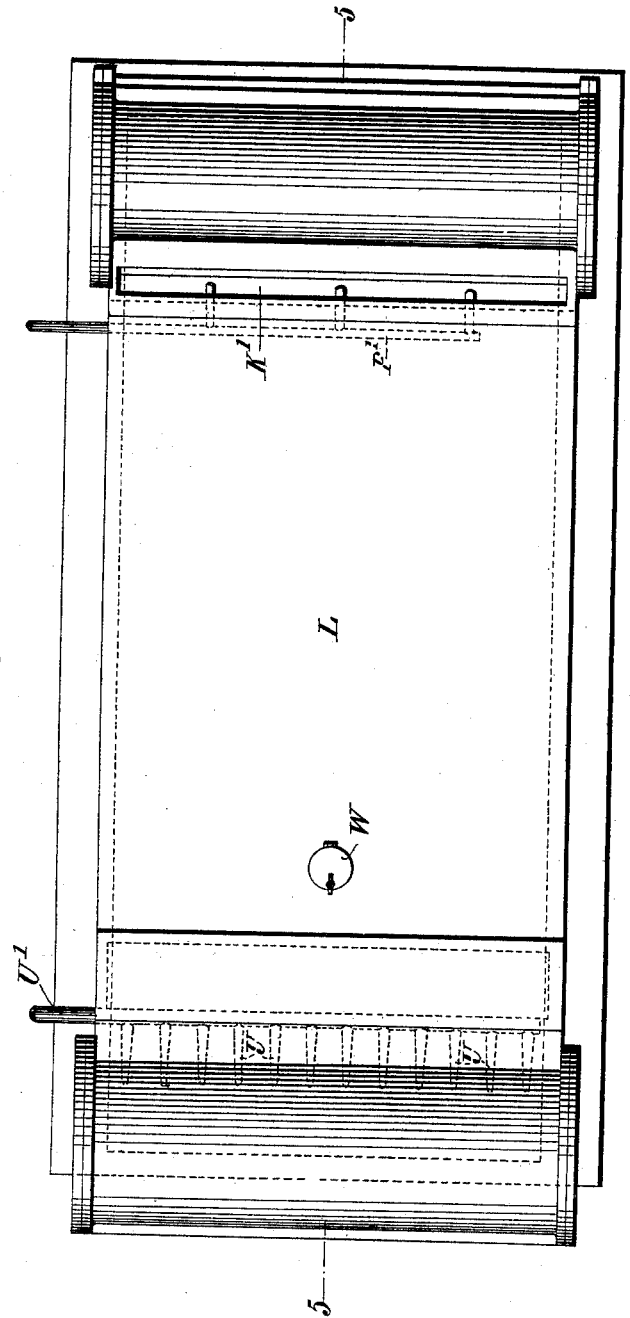

UNITED STATES PATENT OFFICE.

JAMES JOHN SHEDLOCK, OF LONDON, ENGLAND, ASSIGNOR TO THE MUDROS SYNDICATE, LIMITED, OF SAME PLACE.

EXTRACTING METALS FROM THEIR ORES AND APPARATUS THEREFOR.

SPECIFICATION forming part of Letters Patent No. 619,094, dated February 7, 1899.

Application filed June 21, 1897. Serial No. 641,677. (No model.)

*To all whom it may concern:*

Be it known that I, JAMES JOHN SHEDLOCK, metallurgical engineer, a subject of the Queen of Great Britain, of 10 Walbrook, in the city of London, England, have invented Improvements in Extracting Metals from Their Ores and Apparatus Therefor, of which the following is a specification.

This invention relates to the extraction or recovery of metals from their ores and primarily has for its object the extraction of the precious metals from ores of a refractory character, but may be used for any other characters of ores and the extraction of any other metal or metals therefrom to which same may be applicable; and in order that this invention may be easily understood and readily carried into practice I will proceed to fully describe same, with reference to the drawings hereunto annexed, in which—

Figure 1:
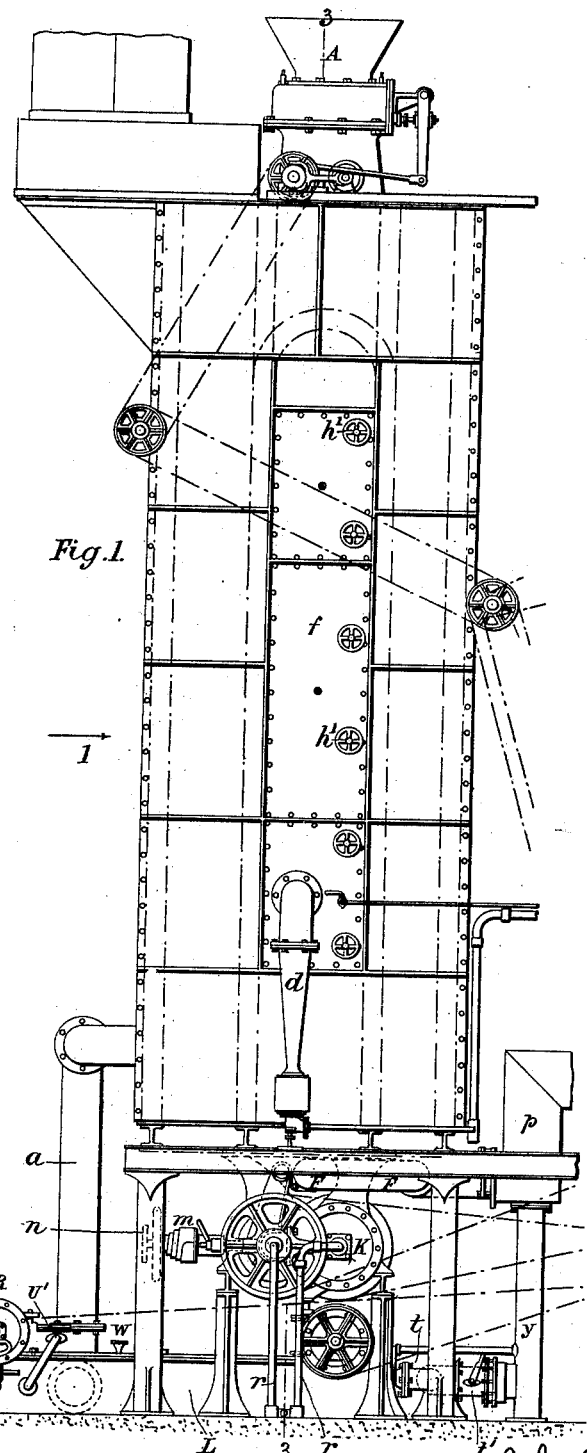
Figure 3:
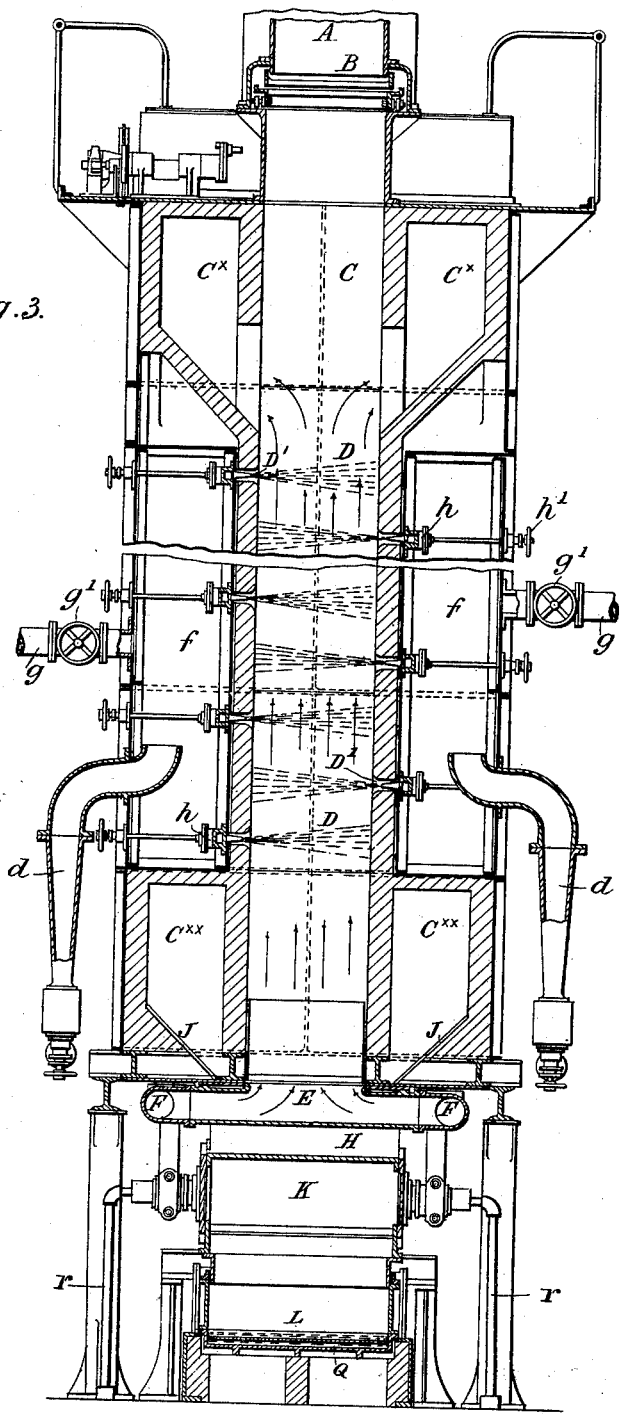
Figure 4:
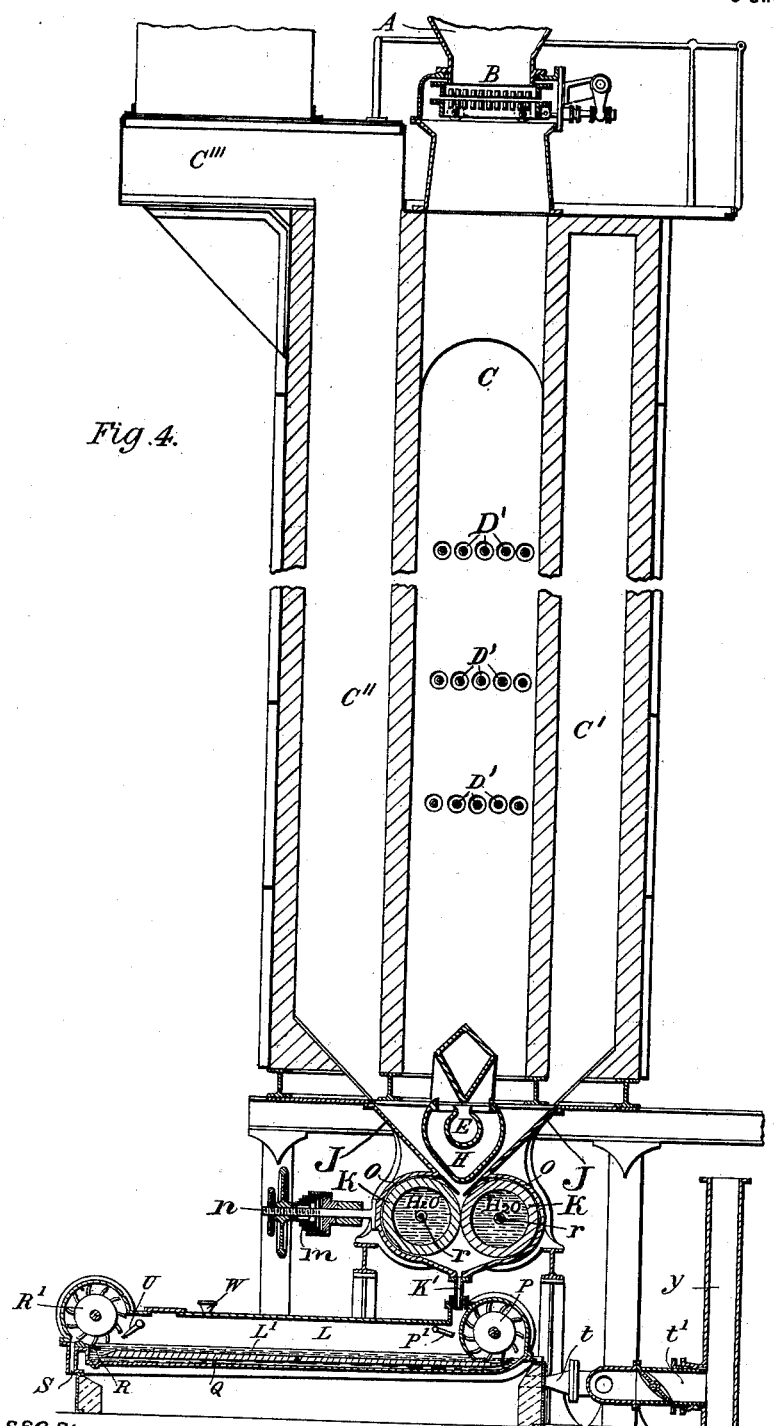
Figure 5:
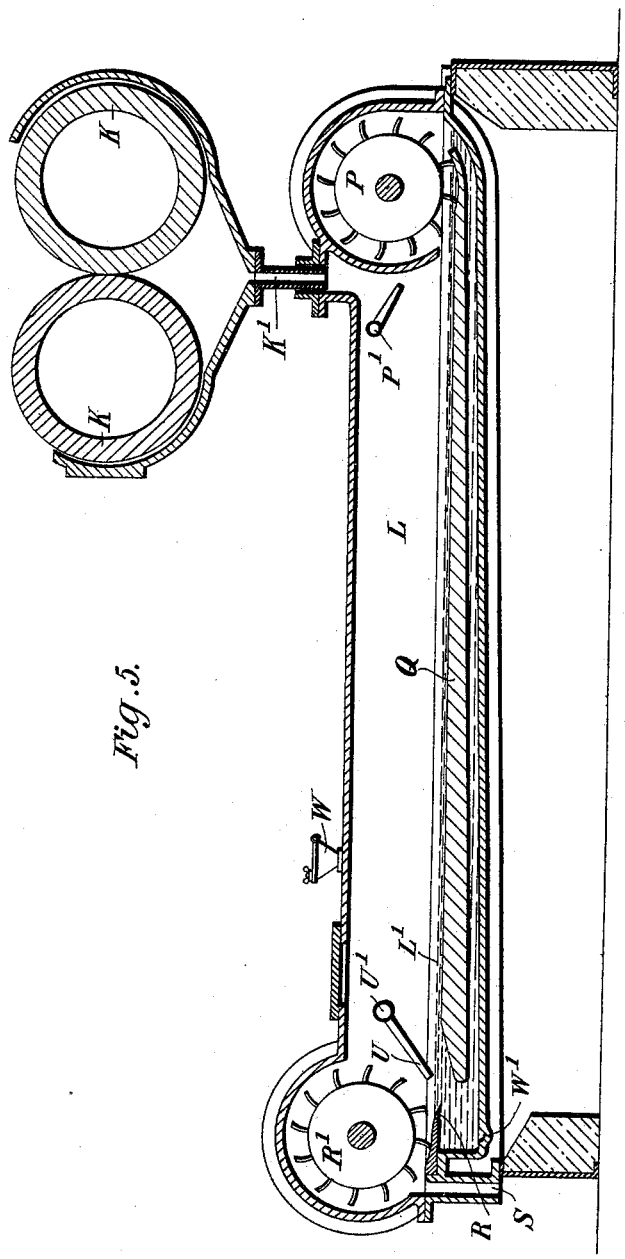

Figure 1 is an exterior view in elevation of the calcining-chamber C and absorbing vessel L thereunder. Fig. 2 is a similar view at right angles to Fig. 1—*i. e.*, looking in the direction of the arrow 1, Fig. 1. Fig. 3 is a vertical section of the calcining-chamber C and absorbing vessel L on the line 3 3, Fig. 1. Fig. 4 is a vertical section on the line 4 4, Fig. 2. Fig. 5 is a longitudinal sectional view of the absorbing vessel L and feeding-rolls, &c., but shown on a larger scale—*i. e.*, on the line 5 5, Fig. 6. Fig. 6 is a plan of Fig. 5, omitting the rolls K. Fig. 7 is an enlarged sectional view showing in detail the valve $h$ and box or case carrying thereon the jets or nozzles D' D' and the valve-regulator $h'$. Fig. 8 is a local sectional view of the delivery end of the absorbing vessel L, showing a modified arrangement of the latter when it is charged with water or aqueous solutions.

Similar letters of reference indicate corresponding parts throughout.

The ore to be treated is first reduced to a fine state of division, in some cases having mixed therewith suitable salts or other equivalently-acting material, such as sodium chlorid, (or any other suitable material may be mixed with the ore,) in which condition it is fed into the hopper A, from whence it is delivered in well-defined quantities, by means of the reciprocating frame or grating B, into the calcining or decomposing chamber C, through which the ore descends in an even shower. At or near the bottom end of this calcining-chamber C a large burner E is provided by means of the flame or flames, from which the ore is heated as it falls through the aforesaid chamber C, or any other suitable means may be used to heat the falling ore. Combustible gases are supplied to the burner E (from a gas-producer of any suitable character or from any suitable source) through the pipe $p$ to the pipes F F. (See Figs. 1 and 3.)

The ore in its descent through the calcining or decomposing chamber C first becomes highly heated, whereby its volatile constituents are driven off. The metalloids and baser metals, &c., are oxidized or freed from the ore by the action of the sprays D D D of steam, air, gas, or vapor, which issue from the jets or nozzles D' D'. Such sprays acting upon the falling ore keep it in a constant state of agitation, causing it to make a tortuous passage in its descent, and thereby maintaining it for a considerable period under their influence. The gases, vapors, and lighter oxids thus produced are carried off with the ascending column of heated gases in the direction shown by the arrows in Fig. 3, through the passages $C^\times$ to the descending-flue C', thence by the passages $C^{\times\times}$ into the ascending-flue C'' to the outlet C''' to the chimney-stack, or, if preferred, the said gases, &c., may be conveyed into settling-chambers with a view to their further treatment, if desired.

The reservoirs $f f$ (see Figs. 1 and 3) are charged with steam, air, gas, or vapor by any suitable means, but advantageously by steam-injectors $d\ d$. The sprays D D, issuing from the jets or nozzles D' D', are governed by means of the valves $h\ h\ h$, operated from the outside of the reservoirs $f f$ by means of the regulators $h'\ h'\ h'$. When it is found desirable in the treatment of certain ores to subject them to the action of a gas or vapor, such as chlorin gas or hydrocarbon vapor, or both, then such gas or vapor may be introduced from any convenient source into the reservoirs $f f$ by the pipes $g\ g$, controlled by suitable valves $g'\ g'$. The calcined ore, freed from its metalloids, &c., (or, as I term them, its "pernicious" constituents,) having passed through the calcining or decomposing chamber C and after being subjected, as aforesaid, to the action of the sprays D D D, falls onto the sloping bottom J J and is delivered by the latter between the triturating or crushing rolls K K, which not only reduce any clinker which may have formed in the calcining or decomposing chamber C, but said rolls K K also serve to deliver the ore in an even and well-defined stream into the alloying or absorbing vessel L.

The rolls K K, inclosed in a gas-tight cover O, (see Figs. 2 and 4,) are kept cool by water or steam introduced into them by the pipes $r\ r$ and are maintained at the desired position relative to one another by means of the spring $m$ and the regulating-screw $n$.

The alloying or absorbing vessel L may be charged with any suitable fluid metal L' (or other suitable menstruum) having an affinity for the metal or metals it is desired to extract from the ore, and in order to present a clean and fresh surface to the ore as it falls from the rolls K K through the channel K' the fluid metal or menstruum L' is caused to flow continuously in one direction by means of the paddle-wheel or bladed drum P, raising the fluid metal or menstruum L' onto the partition Q, which extends nearly the whole length of the alloying or absorbing vessel L, dividing it horizontally or approximately so, the said fluid metal or menstruum returning under the partition Q toward the paddle-wheel or drum P.

The ore as it is carried forward by the flowing metal or menstruum L' parts with its gold or other metal or metals (which it is desired to recover) which are absorbed in and by the said menstruum L', while the gangue and tailings upon their arrival at the delivery end of the alloying or absorbing vessel L are carried onto the shelf R, from whence said gangue and tailings are removed by the wheel or bladed drum R' and passed into the outlets or shoots S S S.

When a fluid metal, such as molten lead, is employed as the alloying or absorbing medium, the gangue and tailings are advantageously removed from the surface of the molten metal on which they float and driven onto the shelf R by means of jets or nozzles U U on the supply-pipe U', from which issue under pressure deoxidizing or reducing gases, which not only act upon the gangue and tailings for their effectual removal or assisting in their removal onto the shelf R, but also act as a means to keep the surface of the molten metal perfectly clean or in such a condition as to readily alloy itself with or absorb the precious or other metals contained in the ore.

If desired, jets similar to and in addition to the jets U U may be placed at any desired point or points between the propelling-wheel P and the shelf R, such additional supply-pipes U' and jets U U being arranged in any convenient and suitable manner.

The alloying or absorbing vessel L and drums P and R' are inclosed in a suitable gas-tight cover, upon which is fitted a receiver provided with a valve W, through which fresh supplies of the fluid metal L' or other menstruum are introduced, as required. The fluid metal or menstruum when saturated to the required degree with the precious or other metal or metals to be recovered may be withdrawn at the outlet-valve W', and the absorbed metal or metals may be separated from the menstruum in any well-known or suitable manner.

When an alloying metal, such as lead, is employed, then it is necessary to maintain it at the required degree of fluidity by any suitable means, advantageously by the combustion of gaseous fuel under the absorbing vessel L, and conveyed to the burner $t$ (regulated by the valve $t'$) by the pipe $y$, connected to the pipe $p$, while the products of combustion from this burner $t$ are carried off by the pipe $a$ into the flue C''.

When the fluid metal L' employed is mercury, then instead of using gas-jets at U U jets of water or air, or both, may be introduced into the alloying or absorbing vessel L through the aforesaid supply-pipes U' and nozzles U U, while at or near the point where the stream of ore enters the vessel L water may be introduced by means of the pipes P', or same may be placed at any other convenient part of the alloying or absorbing vessel L, the gangue or tailings being removed, as before described, by means of the wheel or bladed drum R' into the chutes S S S, into which latter the water (when used) will overflow.

In the treatment of certain ores, such as those containing silver, by means of chlorin or similar gas or vapor introduced into the calcining-chamber C combinations of the chlorin gas, &c., and the silver, &c., are formed, and the absorbing vessel L being charged with a suitable liquid, such as an aqueous solution of potassium cyanid or sodium chlorid, the said combinations are thereby absorbed, or when the ore contains gold and the latter is brought down into the absorbing vessel L in a free state then the liquid in the said vessel may be an aqueous solution of potassium cyanid or other suitable salt. The water or aqueous solutions having absorbed the said combinations or metals, the gangue or tailings sink in the aqueous solution and are withdrawn from the absorbing vessel L by means of the wheel or bladed drum R', arranged as illustrated in Fig. 8—viz., the gangue and tailings falling into the vessel L (instead of floating on the surface of the flowing fluid L', as previously described, when molten lead or mercury or the like is used) would become immersed in the water or aqueous solution and would be carried therewith along the division or partition Q and fall over the end thereof onto the tray R, Fig. 8, or into the lower part of the vessel L, whence they—i. e., the gangue and tailings— are dredged or removed by the blades or scoops on the wheel R' or by any other suitable means, and such gangue or tailings being wet with the liquid in the vessel (which liquid would now contain in solution the precious or other metal to be recovered) therefore means should be provided or care taken to drain such liquid from the gangue or tailings either during their removal or subsequently, so that a minimum (if any) of such solution is lost. In Fig. 8 I have shown such means consisting of a screen $x$, upon which the gangue or tailings may fall from the outlet S, and a receptacle $x'$ beneath the said screen to receive the liquid that may drip through.

Instead of the aforesaid pair of triturating or crushing rolls K K any equivalent or other suitable means may be employed for crushing, regulating, or delivering the finely-divided ore coming from the chamber C, either directly or otherwise, into the absorbing vessel L, and such rolls K K or their equivalent may be mounted directly under said calcining-chamber C, as shown, or same may be arranged in any other suitable position—i. e., otherwise than perpendicularly below said chamber C—and any suitable means interposed or provided to deliver thereto the ore coming from said chamber C. Also the absorbing vessel L may be arranged in any suitable position relative to said rolls K K or equivalent—i. e., arranged otherwise than as shown, if desired.

The provision and employment of a flowing menstruum in an alloying or absorbing vessel, such as L, constitutes a very important and essential feature of the present invention, and it is to be clearly understood that this flowing menstruum may be used either in conjunction with the calcining-chamber C and other parts, as shown, or same may be used in combination and acting in conjunction with any apparatus other than that shown, or, if desired, the absorbing vessel with this flowing menstruum may be used alone—i. e., entirely separate from any calcining apparatus, as shown separately in Figs. 5 and 6. For instance, in the case of ores containing their metals in a free state such ores can be delivered direct from crushing-rolls or stamps into the alloying or absorbing vessel L. In some cases, however—for instance, with molten lead as the menstruum—instead of the latter being made to flow I may use a sufficient number of gas-jets of sufficient power to carry along the ore floating on the lead to the point where same is removed, while in the case of mercury being the menstruum I may, if desired, use jets of air, water, or gas or combinations thereof for the same purpose.

Having thus described my invention, what I claim as new, and desire to secure by Letters Patent of the United States, is—

1. The improved process of treating ores of the character described, which consists in delivering finely-divided ore in a shower into a calcining-chamber, heating the ore to the required degree as it falls and also subjecting it while descending to the action of successive fluid sprays issuing at varying points from top to bottom of said chamber, then passing the ore so treated between suitable grinding and feeding rollers and separating the metal from the gangue and tailings, substantially as described.

2. The improved process of treating ores of the character described, which consists in delivering finely-divided ore in a shower into a calcining-chamber, heating the ore to the required degree as it falls and also subjecting it while descending to the action of successive fluid sprays issuing at varying points from top to bottom of said chamber between grinding and feeding rollers, then delivering the ore into an absorbing vessel containing a menstruum in which the metal to be recovered is absorbed, separating the recovered metal from the menstruum and removing the gangue or tailings from said vessel, substantially as described.

3. The improved process of treating ores of the character described, which consists in delivering finely-divided ore in a shower into a calcining-chamber, heating the ore to the required degree as it falls and also subjecting the ore while descending to the action of successive fluid sprays issuing at varying points from top to bottom of said chamber, conducting the gases, vapors and lighter oxids as they arise downward alongside and outside said calcining-chamber, then conducting them upwardly alongside and outside said chamber passing the ore from the calcining-chamber between grinding and feeding rollers, delivering the ore from said rollers into an absorbing vessel containing a menstruum in which the metal to be recovered is absorbed, separating the recovered metal from the menstruum and removing the gangue and tailings from said vessel, substantially as described.

4. The improved process of treating ores of the character described, which consists in delivering finely-divided ore in a shower into a calcining-chamber, heating the ore to the required degree as it falls and also subjecting the ore to the action of fluid sprays as it descends, then crushing the ore so treated and then delivering the ore into an absorbing vessel containing a flowing menstruum and directing fluid jets against the surface of the said menstruum which removes the gangue and tailings and keeps the surface of the menstruum clean, substantially as described.

5. The improved process of treating ores of the character described, which consists in delivering finely-divided ore in a shower into a calcining-chamber, heating the ore to the required degree as it falls and also subjecting the ore to the action of fluid sprays as it descends, then grinding the ore so treated, and then delivering the ore into an absorbing vessel containing a flowing menstruum and directing jets of reducing-gases against the surface of the said menstruum which removes the gangue and tailings and keeps the surface of the menstruum clean, substantially as described.

6. In an apparatus for extracting metals from their ores, the combination with an upright calcining-chamber having numerous orifices in the sides ranging from top to bottom thereof for the admission of fluid or vapor jets, inlet-pipes to supply said jets of fluid or vapor through said orifices at successive heights and from top to bottom of said chamber, means for feeding the ore into the said chamber from the top thereof in a finely-divided state and in an even shower, a burner located at the lower end of said chamber to direct its heat directly upward in said chamber, a descending-flue alongside said chamber, and a passage communicating from the upper end of said chamber to said flue, an ascending-flue also mounted alongside said chamber and communicating therewith near its bottom by passages, grinding-rollers out of contact with the outside air and adapted to receive the ore from said chamber and crush said ore while hot and pass same out of said chamber, substantially as described.

7. In an apparatus for extracting metals from their ores, the combination with an upright calcining-chamber having numerous orifices through its sides ranging from top to bottom thereof for the admission of vapor or fluid jets, inlet-pipes to supply said jets of fluid through said orifices at successive heights from top to bottom of said chamber, reservoirs located alongside said chamber and adapted to carry the fluid for supplying said jets, means for feeding the ore into the said chamber from the top thereof in a finely-divided state and in an even shower, a burner located at the lower end of said chamber and adapted to direct its heat upward in said chamber, a flue for descending gases alongside said chamber and a passage communicating from the upper end of said chamber to said flue, a flue for ascending gases also located alongside said chamber and communicating therewith near its bottom by passages, grinding-rollers adapted to receive the ore from said chamber and grind it while hot and then pass the ore out of said chamber, and a separator adapted to receive the ore from said rollers in an even shower and to separate the metal therefrom, substantially as described.

8. In an apparatus for extracting metals from their ores, the combination with a vessel adapted to hold a menstruum of a partition located near the bottom thereof dividing the upper portion of said vessel from the bottom thereof, the upper part of said vessel communicating with the portion below said partition at each end thereof, a bladed wheel mounted at one end of said vessel and adapted to remove the gangue and tailings, a second wheel mounted at the other end and adapted to impart motion to said menstruum, fluid jets mounted above said menstruum and directed against the surface thereof, a passage leading from said vessel to convey said gangue and tailings, an inlet-duct for said ore, the whole being inclosed in a gas-tight casing with means for heating said tank, substantially as described.

JAMES JOHN SHEDLOCK.

Witnesses:
  ALFRED NUTTING,
  H. DENTON-JAMESON.